United States Patent
Hamada (10) Patent No.: US 11,200,346 B2
(45) Date of Patent: Dec. 14, 2021

(54) SECURE COMPUTATION FOR READING MULTIPLE ELEMENTS FROM A SECURE TEXT ARRAY

(71) Applicant: NIPPON TELEGRAPH AND TELEPHONE CORPORATION, Chiyoda-ku (JP)

(72) Inventor: Koki Hamada, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 314 days.

(21) Appl. No.: 16/313,233

(22) PCT Filed: Jun. 30, 2017

(86) PCT No.: PCT/JP2017/024149
§ 371 (c)(1),
(2) Date: Dec. 26, 2018

(87) PCT Pub. No.: WO2018/008547
PCT Pub. Date: Jan. 11, 2018

(65) Prior Publication Data
US 2019/0163933 A1   May 30, 2019

(30) Foreign Application Priority Data
Jul. 6, 2016   (JP) .............................. JP2016-134090

(51) Int. Cl.
*G06F 21/00* (2013.01)
*G06F 21/72* (2013.01)
*G09C 1/00* (2006.01)

(52) U.S. Cl.
CPC ............... *G06F 21/72* (2013.01); *G09C 1/00* (2013.01)

(58) Field of Classification Search
CPC ........ G06F 21/72; G06F 21/12; G06F 21/121; G06F 21/123; G06F 21/125; G06F 21/126; G06F 21/128; G06F 21/14; G09C 1/00
See application file for complete search history.

(56) References Cited

U.S. PATENT DOCUMENTS 7,961,871 B2 * 6/2011 Okubo ................. H04L 9/0637
                                                         380/28
9,628,266 B2 * 4/2017 Rohloff .................... H04L 9/06
(Continued)

FOREIGN PATENT DOCUMENTS

WO   WO 2012/102203 A1   8/2012

OTHER PUBLICATIONS

Hamada et al. ("Round-Efficient Pattern Matching for Secure Computation", Oct. 15, 2014) (Year: 2014).*
(Continued)

*Primary Examiner* — Jeffrey C Pwu
*Assistant Examiner* — Helai Salehi
(74) *Attorney, Agent, or Firm* — Oblon, McClelland, Maier & Neustadt, L.L.P.

(57) ABSTRACT

Multiple elements are efficiently read from a secured array. A secure text array $<a>=(<a[0]>, \ldots, <a[n-1]>)$ where an array $a=(a[0], \ldots, a[n-1])$ having a size of n is secured, secure text $<x>$ of an integer x that is equal to or higher than 0 and less than n, and in integers $i_0, \ldots, i_{m-1}$ that are equal to or higher than 0 and less than n are input into an input part 11. A secure shift part 12 secure-shifts the secure text array $<a>$ by $<x>$ to obtain a secure text array $<a'>=(<a'[0]>, \ldots, <a'[n-1]>)$ where an array $a'=(a'[0], \ldots, a'[n-1])$ obtained by shifting leftward the array a by x is secured. An array generation part 13 generates a secure text array $<b>=(<a'[i_0]>, \ldots, <a'[i_{m-1}]>)$ from the secure text array $<a'>$.

8 Claims, 3 Drawing Sheets

(56) References Cited

U.S. PATENT DOCUMENTS

| | | | |
|---|---|---|---|
| 2013/0204780 A1 | 11/2013 | Ikarashi et al. | |
| 2013/0305033 A1* | 11/2013 | Lacson | H04L 9/0618 |
| | | | 713/150 |
| 2017/0078086 A1* | 3/2017 | Rohloff | H04L 9/06 |

OTHER PUBLICATIONS

Extended European Search Report dated Jan. 3, 2020 in European Patent Application No. 17824152.7, 6 pages.

Hamada, H., et al., "A Round—Efficient Pattern Matching Algorithm for Secure Multi-Party Computation", CSS2014 Computer Security Symposium 2014 Ronbunshu, vol. 2014 No. 2, XP003032484, Oct. 15, 2014, pp. 674-681 (reference previously filed, now submitting English translation only).

Krips, T., et al., "Hybrid Model of Fixed and Floating Point Numbers in Secure Multiparty Computations", In: "Distributed Computing: 19$^{th}$ International Conference, DISC 2005, Sep. 26-29, 2005, Proceedings", vol. 8783, XP055652926, Jan. 1, 2014, pp. 179-197.

International Search Report dated Sep. 19, 2017 in PCT/JP2017/024149 filed on Jun. 30, 2017.

Chida, K. et al., "A Three-Party Secure Function Evaluation with Lightweight Verifiability Revisited", CSS 2010, 2010 (total 6 pages) (with English Abstract).

Hamada, K. et al., "A Round-Efficient Pattern Matching Algorithm for Secure Multi-party Computation", Computer Security Symposium 2014, vol. 2014, Oct. 2014, pp. 674-681 (total 8 pages) (with English Abstract).

Office Action dated Jul. 9, 2019 in Japanese Patent Application No. 2018-526339, 15 pages (with English translation).

Watanabe, Y. et al. "Oblivious Automata Evaluation with Constant Round Communication" SCIS 2012, The 29th Symposium on Cryptography and Information Security, The Institute of Electronics, Information and Communication Engineers, 2012, 8 pages (with English abstract).

Ivan Damgård, et al., "Fast Oblivious AES A Dedicated Application of the MiniMac Protocol," AFRICACRYPT 2016, LNCS 9646, XP47345706, 2016, pp. 245-264.

\* cited by examiner

SECURE COMPUTATION FOR READING MULTIPLE ELEMENTS FROM A SECURE TEXT ARRAY

TECHNICAL FIELD

The present invention relates to applied cryptographic technology and, in particular, to technology of reading from an array without disclosing input data.

BACKGROUND ART

Methods of obtaining specific operation results without decrypting encrypted numerical values include a method called secure computation (see Non-patent literature 1, for example). The method of Non-patent literature 1 performs encryption that allows three secure computation devices to hold the divided fragments of the numerical value, and the three secure computation devices perform cooperative computation, which can allow the three secure computation devices to hold the results of addition and subtraction, constant addition, multiplication, constant multiplication, logical operation (negation, logical multiplication, logical addition, and exclusive OR), and data format conversion (integer, and binary numeral) without decrypting the numerical value, in a state of being distributed among the three secure computation devices, i.e., being left encrypted.

For a case of reading an element <a[x]> at the position of an encrypted number <x> from an array (<a[0]>, <a[1]>, ..., <a[n-1]>) encrypted by secure computation or the like, there is a method of achievement through comparison between the encrypted number <x> and the positions 0, 1, ..., n-1 of all the elements of the array.

PRIOR ART LITERATURE

Non-Patent Literature

Non-patent literature 1: Koji Chida, Koki Hamada, Dai Ikarashi, and Katsumi Takahashi, "A Three-Party Secure Function Evaluation with Lightweight Verifiability Revisited", CSS 2010, 2010.

SUMMARY OF THE INVENTION

Problems to be Solved by the Invention

However, according to the conventional art, $\Omega(mn)$-time comparisons are required for reading m times from a secured array having a size of n. Accordingly, the efficiency is low.

In view of such a point described above, the present invention has an object to provide a secure computation technology capable of efficiently reading multiple elements from a secured array.

Means to Solve the Problems

To solve the problems described above, a secure computation system of a first aspect of the present invention is a secure computation system comprising three or more secure computation devices, the secure computation device comprises: an input part that receives a secure text array <a>=(<a[0]>, ..., <a[n-1]>) where an array a=(a[0], a[1], ..., a[n-1]) having a size of n is secured, secure text <x> of an integer x that is equal to or higher than 0 and less than n, and m integers $i_0, \ldots, i_{m-1}$ that are equal to or higher than 0 and less than n; a secure shift part that secure-shifts the secure text array <a> by <x> to obtain a secure text array <a'>=(<a'[0]>, ..., <a'[n-1]>) where an array a'=(a'[0], ..., a'[n-1]) obtained by shifting leftward the array a by x is secured; and an array generation part that generates a secure text array <b>=(<a'[$i_0$]>, ..., <a'[$i_{m-1}$]>) from the secure text array <a'>.

A secure computation system of a second aspect of the present invention is a secure computation system comprising three or more secure computation devices, the secure computation device comprises: an input part that receives a secure text array <a>=(<a[0]>, ..., <a[n-1]>) where an array a=(a[0], ..., a[n-1]) having a size of n is secured, secure text <x> of an integer x that is equal to or higher than 0 and less than n, and a natural number m; a secure shift part that secure-shifts the secure text array <a> by <x> to obtain a secure text array <a'>=(<a'[0]>, ..., <a'[n-1]>) where an array a'=(a'[0], ..., a'[n-1]) obtained by shifting leftward the array a by x is secured; and an array generation part that generates a secure text array <b>=(<a'[0]>, ..., <a'[m-1]>) from the secure text array <a'>.

Effects of the Invention

The secure computation technology of the present invention can efficiently read multiple elements from a secured array.

DETAILED DESCRIPTION OF THE EMBODIMENTS

Prior to description of embodiments, notations in this Description and the definitions of terms used in this Description are described.

<Notation>

A value secured by applying encryption or secret sharing to a certain value "a" is called the secure text of "a" and is represented as <a>. Meanwhile, "a" is called the plain text of <a>. In a case where the securing is secret sharing, a set of the secret sharing fragments held by the individual parties according to <a> is referred to.

<Secure Shift>

A process of adopting, as inputs, secure text array <a>=(<a[0]>, <a[1]>, ..., <a[n-1]>) having a size of n, and secure text <d> having a shift amount of d, and of computing a secure text array <a'>=(<a[d]>, <a[d+1]>, ..., <a[n-1]>, <a[0]>, <a[1]>, ..., <a[d-1]>) with <a> being shifted leftward by d, is called secure shift, and is described by the following formula.

$$<a'> \leftarrow \mathrm{Shift}(<a>,<d>)$$

A method of achieving the secure shift is described in the following reference document 1.

[Reference Document 1] Koki Hamada, Naoto Kiribuchi, and Dai Ikarashi, "A round-efficient pattern matching algorithm for secure multi-party computation", Computer Security Symposium 2014, vol. 2014, pp. 674-681, October 2014

Hereinafter, embodiments of the present invention are described in detail. In the diagrams, configuration parts having the same functions are assigned the same numerals, and redundant description thereof is omitted.

First Embodiment

A first embodiment of the present invention is a method of adopting, as inputs, secure text array $<a> = (<a[0]>, <a[n-1]>)$ having a size of n, secure text $<x>$ of a natural number x representing a position, and in plain text pieces $i_0, i_1, \ldots, i_{m-1}$ representing a relative position from x, and of obtaining in secure text pieces $(<a[x+i_0 \bmod n]>, <a[x+i_1 \bmod n]>, \ldots, <a[x+i_{m-1} \bmod n]>)$ without disclosing the values of x and an a[n−1].

Figure 1:
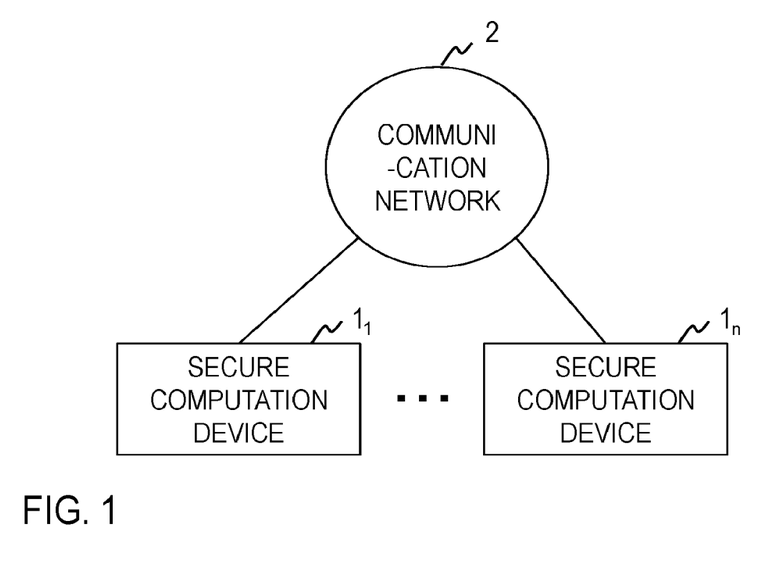
FIG. 1 is a diagram exemplifying a functional configuration of a secure computation system.

A secure computation system of a first embodiment comprises n (≥3) secure computation devices $1_1, \ldots, 1_n$, as exemplified in FIG. 1. In this embodiment, the secure computation devices $1_1, \ldots, 1_n$ are each connected to a communication network 2. The communication network 2 is a communication network that is of a circuit switching scheme or a packet switching scheme and is configured to allow the secure computation devices $1_1, \ldots, 1_n$ to communicate with each other. For example, the Internet, a LAN (Local Area Network), a WAN (Wide Area Network) or the like may be used. Each device is not necessarily capable of communicating online via the communication network 2. For example, it may be configured such that information to be input into the secure computation devices $1_i$ ($i \in \{1, \ldots, n\}$) may be stored in a portable recording medium, such as magnetic tape or a USB memory, and input may be performed offline from the portable recording medium.

Figure 2:
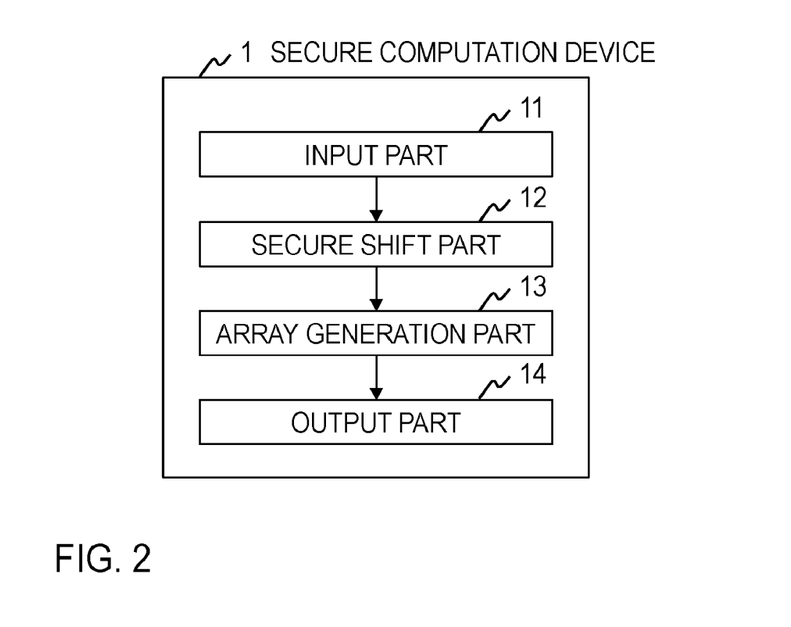
FIG. 2 is a diagram exemplifying a functional configuration of a secure computation device.

As exemplified in FIG. 2, the secure computation device 1 includes an input part 11, a secure shift part 12, an array generation part 13, and an output part 14. The secure computation device 1 performs the process of each step exemplified in FIG. 3, thereby achieving a secure computation method of the first embodiment.

The secure computation device 1 is, for example, a special device configured to include a publicly known or dedicated computer which includes a central processing unit (CPU) and a main memory (RAM: Random Access Memory) and the like and into which a special program has been read. The secure computation device 1 executes each process under control by the central processing unit, for example. Data input into the secure computation device 1 and data obtained by each process are stored in the main memory, for example. The data stored in the main memory is read into the central processing unit as required, and is used for another process. At least some of the processing parts of the secure computation device 1 may be configured by hardware, such as an integrated circuit.

Figure 3:
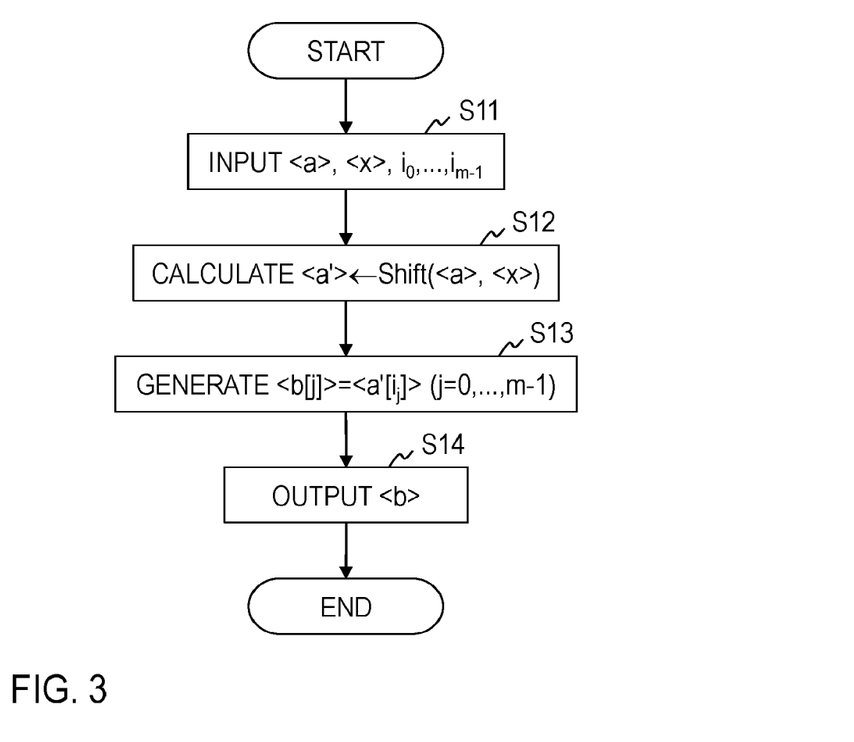
FIG. 3 is a diagram exemplifying processing procedures of a secure computation method.

Referring to FIG. 3, the processing procedures of the secure computation method of the first embodiment are described.

In step S11, a secure text array $<a> = (<a[0]>, <a[1]>, \ldots, <a[n-1]>)$ where an array $a = (a[0], a[1], \ldots, a[n-1])$ having a size of n is secured, secure text $<x>$ of an integer that is equal to or higher than 0 and less than n, and m integers $i_0, \ldots, i_{m-1}$ that are equal to or higher than 0 and less than n are input into the input part 11. The secure text array $<a>$ and the secure text $<x>$ are transmitted to the secure shift part 12. The integers $i_0, \ldots, i_{m-1}$ are transmitted to the array generation part 13.

In step S12, the secure shift part 12 secure-shifts the secure text array $<a>$ by $<x>$ to obtain a secure text array $<a'> = (<a'[0]>, <a'[1]>, \ldots, <a'[n-1]>)$ where an array $a' = (a'[0], a'[n-1]) = (a[x], a[x+1], \ldots, a[n-1], a[0], a[1], \ldots, a[x-1])$ obtained by shifting the array a leftward by x is secured. That is, $<a'> \leftarrow \text{Shift}(<a>, <x>)$ is executed. The secure text array $<a'>$ is transmitted to the array generation part 13.

In step S13, the array generation part 13 obtains, from the secure text array $<a'>$, a secure text array $<b> = (<b[0]>, <b[1]>, \ldots, [m-1]>) = (<a'[i_0]>, <a'[i_1]>, \ldots, <a'[i_{m-1}]>)$ where an array $b = (b[0], b[1], \ldots, b[m-1]) = (a'[i_0], a'[i_1], \ldots, a'[i_{m-1}]) $ is secured, assuming that $<b[j]> = <a'[i_j]> (0 \leq j < m)$.

In step S14, the secure text array $<b>$ is output from the output part 14.

Second Embodiment

A second embodiment of the present invention has a configuration where $i_j = j$ is applied to that of the first embodiment, that is, a configuration of reading in elements consecutive from the position x. The second embodiment is a method of adopting, as inputs, secure text array $(<a[0]>, <a[1]>, \ldots, <a[n-1]>)$ that has been secured through secure computation or encryption and has a size of n, secure text $<x>$ representing a position, and plain text m representing the sizes of outputs, and of obtaining m secure text pieces $(<a[x \bmod n]>, <a[x+1 \bmod n]>, \ldots, <a[x+m-1 \bmod n]>)$ without disclosing the values of x and a[0], a[1], …, a[n−1].

Figure 4:
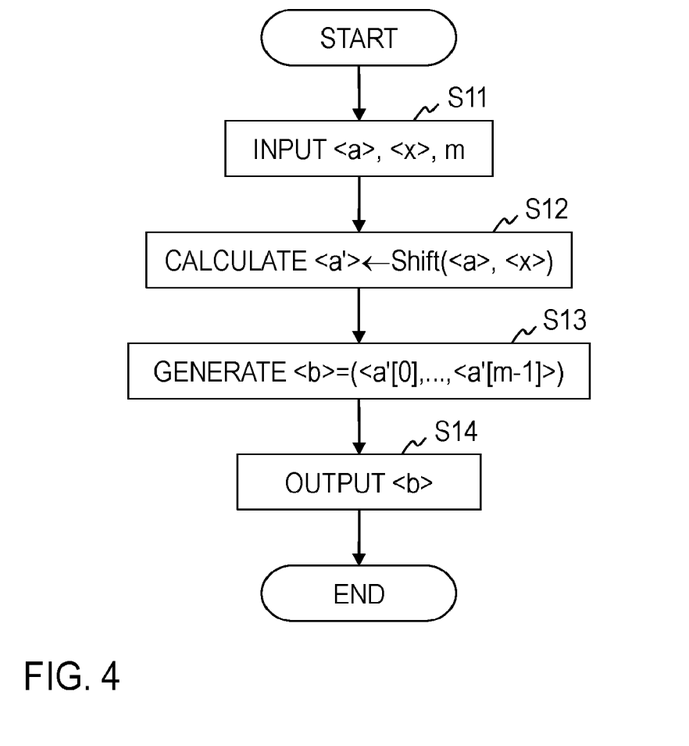
FIG. 4 is a diagram exemplifying processing procedures of a secure computation method.

Referring to FIG. 4, the processing procedures of the secure computation method of a second embodiment are described. Hereinafter, differences from the first embodiment described above are mainly described.

In step S11, a secure text array $<a> = (<a[0]>, <a[1]>, \ldots, <a[n-1]>)$ where an array $a = (a[0], a[1], \ldots, a[n-1])$ having a size of n is secured, secure text $<x>$ of an integer x that is equal to or higher than 0 and less than n, and a natural number in are input into the input part 11. The secure text array $<a>$ and the secure text $<x>$ are transmitted to the secure shift part 12. The natural number m is transmitted to the array generation part 13.

As with the first embodiment, in step S12, the secure shift part 12 secure-shifts the secure text array $<a>$ by $<x>$ to obtain a secure text array $<a'> = (<a'[0]>, <a'[1]>, \ldots, <a'[n-1]>)$ where an $a' = (a'[0], a'[1], \ldots, a'[n-1]) = (a[x], a[x+1], \ldots, a[n-1], a[0], a[1], \ldots, a[x-1])$ obtained by shifting the array a leftward by x is secured. That is, $<a'> \leftarrow \text{Shift}(<a>, <x>)$ is executed. The secure text array $<a'>$ is transmitted to the array generation part 13.

In step S13, the array generation part 13 obtains, from the secure text array $<a'>$, a secure text array $<b> = (<b[0]>, <b[1]>, \ldots, <b[m-1]>) = (<a'[0]>, <a'[1]>, \ldots, <a'[m-1]>)$ where an array $b = (b[0], b[1], \ldots, b[m-1]) = (a'[0], a'[1], \ldots, a'[m-1])$ is secured.

In step S14, the secure text array $<b>$ is output from the output part 14.

The point of the present invention is as follows. While conventionally the entire secure text array is required to be read in times for comparison for the entire secure text array, the present invention allows achievement only with shifting the secure text array one time in a case where the relative positions of in-time reading positions may be disclosed. First, the secure text array is shifted leftward by x. Accordingly, reading of the $x+i_j$-th element is achieved only by taking the $i_1$-th element of the shifted array.

With such a configuration, according to the secure computation technology of the present invention, the process of reading the secure text pieces of the $(x+i_0)$-th, $(x+i_1)$-th, ..

., $(x+i_{m-1})$-th elements from the array of n secure text pieces can be achieved only by the secure shift computation one time. Independently repeating the conventional secure reading during secure reading with the relative position being allowed to be disclosed requires $\Omega(mn)$ secure text comparisons. However, according to the present invention, achievement is made by shift computing of the secure text array only one time.

The embodiments of the present invention have thus been described above. However, the specific configuration is not limited to that in these embodiments. Even if the design is appropriately changed in a range without departing from the spirit of the present invention, it is a matter of course that the configuration is included in the present invention. The various processes described in the embodiments can be executed in a time-series manner according to the order of the description. Alternatively, such execution may be performed in parallel or individually, in conformity with the processing capability of the device that executes the processes, or as required.

[Program and Recording Medium]

In the cases where the various processing functions in each device described in the embodiments are implemented with a computer, the processing content of the functions that each device should have is described as a program. The program is executed by the computer, thereby achieving the various processing functions in each device described above on the computer.

The program that describes the processing content can be preliminarily recorded in a computer-readable recording medium. The computer-readable recording medium may be, for example, any computer-readable recording medium, such as a magnetic recording device, an optical disk, a magneto-optical recording medium, or a semiconductor memory.

The program is distributed by, for example, selling, transferring, or lending a portable recording medium, such as DVD or CD-ROM, where the program is recorded. Alternatively, a configuration may be adopted where the program may be preliminarily stored in a storing device of a server computer, and the program may be transferred from the server computer to another computer via a network, thereby distributing the program.

For example, the computer for executing such a program, first, stores the program recorded in a portable recording medium or transferred from a server computer, temporarily in its storing device. At the time of executing the process, the computer reads the program recorded in its recording medium, and executes the processes according to the read program. According to another execution mode of this program, the computer may directly read the program from the portable recording medium, and execute the processes according to the program. Further alternatively, every time the program is transferred to the computer from the server computer, the computer may successively execute the process according to the received program. Another configuration may be adopted that executes the processes described above through a service of what is called an ASP (Application Service Provider) type according to which the program is not transferred from the server computer to the computer concerned, and the processing function is achieved only by an execution instruction therefor and acquisition of the result. The program according to the embodiments include information that is provided for the processes by the computer and conforms to the program (data and the like that are not direct instructions to the computer but have characteristics defining the processes of the computer).

According to the embodiments, this device is thus configured by executing a predetermined program on the computer. Alternatively, at least a part of the processing content may be achieved as hardware.

INDUSTRIAL APPLICABILITY

The secure computation technology of the present invention is applicable, with the information being secured, to genome information analysis, statistical computation, database processing, medical information analysis, customer information analysis, sales analysis and the like, for example.

What is claimed is:

1. A secure computation system comprising three or more secure computation devices for generating a secure text array <b>, which represents plain text array "b" in concealed form, having m elements by reading out elements whose positions are $x+i_0, \ldots, x+i_{m-1}$ from a secure text array <a>, which represents plain text array "a" in concealed form, having n elements while concealing x, wherein x denotes an absolute position of the element to be read out in the array a, $i_0, \ldots, i_{m-1}$ denote relative positions of the elements to be read out from x in the array a, x is an integer that is equal to or higher than 0 and less than n, and $i_0, \ldots, i_{m-1}$ are integers that are equal to or higher than 0 and less than n, each of the three or more secure computation devices comprises circuitry configured to:

receive, over a network, a secret share of the secure text array <a>=(<a[0]>, ..., <a[n−1]>), a secret share of a secure text <x>, and the plain text integers $i_0, \ldots, i_{m-1}$, wherein the secure text array <a> is obtained by securing the array a=(a[0], a[1], ..., a[n−1]), having a size of n, by secret sharing, and the secure text <x> is obtained by securing an integer x by secret sharing, wherein secret sharing is a process in which an entire original plain text data is concealed from each of a plurality of devices by dividing the entire original plain text data into fragments which are shared among the plurality of devices;

obtain a secure text array <a'>=(<a'[0]>, ..., <a'[n−1]>) using the secure text array <a> and the secure text <x>, wherein the secure text array <a'> is obtained by securing an array a'=(a'[0], ..., a'[n−1]) by secret sharing, and the array a' is obtained by shifting leftward the array a by x; and generate a secure text array <b>=(<a'[$i_0$]>, ..., <a'[$i_{m-1}$]>) from the secure text array <a'>, wherein each of the three or more secure computation devices is configured to act upon a divided portion of the secure text array <a>, the secure text <x>, and the secure text array <b>, such that the original values of a, x, and b are concealed from each of the three or more secure computation devices.

2. A secure computation system comprising three or more secure computation devices for generating a secure text array <b>, which represents plain text array "b" in concealed form, having m elements by reading out elements whose positions are x+0, ..., x+m−1 from a secure text array <a>, which represents plain text array "a" in concealed form, having n elements while concealing x, wherein x denotes an absolute position of the element to be read out in the array a, m denotes a count of elements to be read out from x, x is an integer that is equal to or higher than 0 and less than n, and m is a natural number, each of the three or more secure computation devices comprises circuitry configured to:

receive, over a network, a secret share of the secure text array $<a>=(<a[0]>, \ldots, <a[n-1]>)$, a secret share of a secure text $<x>$, and the plain text natural number m, wherein the secure text array $<a>$ is obtained by securing the array $a=(a[0], \ldots, a[n-1])$ having a size of n, by secret sharing, and the secure text $<x>$ is obtained by securing an integer x by secret sharing, wherein secret sharing is a process in which an entire original plain text data is concealed from each of a plurality of devices by dividing the entire original plain text data into fragments which are shared among the plurality of devices;

obtain a secure text array $<a'>=(<a'[0]>, \ldots, <a'[n-1]>)$ using the secure text array $<a>$ and the secure text $<x>$, wherein the secure text array $<a'>$ is obtained by securing an array $a'=(a'[0], \ldots, a'[n-1])$ by secret sharing, and the array $a'$ is obtained by shifting leftward the array a by x; and generate a secure text array $<b>=(<a'[0]>, \ldots, <a'[m-1]>)$ from the secure text array $<a'>$, wherein each of the three or more secure computation devices is configured to act upon a divided portion of the secure text array $<a>$, the secure text $<x>$, and the secure text array $<b>$, such that the original values of a, x, and b are concealed from each of the three or more secure computation devices.

3. A secure computation device included in a secure computation system comprising three or more secure computation devices for generating a secure text array $<b>$, which represents plain text array "b" in concealed form, having m elements by reading out elements whose positions are $x+i_0, \ldots, x+i_{m-1}$ from a secure text array $<a>$, which represents plain text array "a" in concealed form, having n elements while concealing x, wherein x denotes an absolute position of the element to be read out in the array a, $i_0, \ldots, i_{m-1}$ denote relative positions of the elements to be read out from x in the array a, x is an integer that is equal to or higher than 0 and less than n, and $i_0, \ldots, i_{m-1}$ are integers that are equal to or higher than 0 and less than n, each of the three or more secure computation devices comprises circuitry configured to:

receive, over a network, a secret share of the secure text array $<a>=(<a[0]>, \ldots, <a[n-1]>)$, a secret share of a secure text $<x>$, and the plain text integers $i_0, \ldots, i_{m-1}$, wherein the secure text array $<a>$ is obtained by securing the array $a=(a[0], \ldots, a[n-1])$, having a size of n, by secret sharing, and the secure text $<x>$ is obtained by securing an integer x by secret sharing, wherein secret sharing is a process in which an entire original plain text data is concealed from each of a plurality of devices by dividing the entire original plain text data into fragments which are shared among the plurality of devices;

obtain a secure text array $<a'>=(<a'[0]>, \ldots, <a'[n-1]>)$ using the secure text array $<a>$ and the secure text $<x>$, wherein the secure text array $<a'>$ is obtained by securing an array $a'=(a'[0], \ldots, a'[n-1])$ by secret sharing, and the array $a'$ is obtained by shifting leftward the array a by x; and generate a secure text array $<b>=(<a'[i_0]>, \ldots, <a'[i_{m-1}]>)$ from the secure text array $<a'>$, wherein each of the three or more secure computation devices is configured to act upon a divided portion of the secure text array $<a>$, the secure text $<x>$, and the secure text array $<b>$, such that the original values of a, x, and b are concealed from each of the three or more secure computation devices.

4. A secure computation device included in a secure computation system comprising three or more secure computation devices for generating a secure text array $<b>$ which represents plain text array "b" in concealed form, having m elements by reading out elements whose positions are $x+0, \ldots, x+m-1$ from a secure text array $<a>$, which represents plain text array "a" in concealed form, having n elements while concealing x, wherein x denotes an absolute position of the element to be read out in the array a, m denotes a count of elements to be read out from x, x is an integer that is equal to or higher than 0 and less than n, and m is a natural number, each of the three or more secure computation devices comprises circuitry configured to:

receive, over a network, a secret share of the secure text array $<a>=(<a[0]>, \ldots, <a[n-1]>)$, a secret share of a secure text $<x>$, and the plain text natural number m, wherein the secure text array $<a>$ is obtained by securing the array $a=(a[0], \ldots, a[n-1])$, having a size of n, by secret sharing, and the secure text $<x>$ is obtained by securing an integer x by secret sharing, wherein secret sharing is a process in which an entire original plain text data is concealed from each of a plurality of devices by dividing the entire original plain text data into fragments which are shared among the plurality of devices;

obtain a secure text array $<a'>=(<a'[0]>, \ldots, <a'[n-1]>)$ using the secure text array $<a>$ and the secure text $<x>$, wherein the secure text array $<a'>$ is obtained by securing an array $a'=(a'[0], \ldots, a'[n-1])$ by secret sharing, and the array $a'$ is obtained by shifting leftward the array a by x; and generate a secure text array $<b>=(<a'[0]>, \ldots, <a'[m-1]>)$ from the secure text array $<a'>$.

5. A secure computation method for generating a secure text array $<b>$, which represents plain text array "b" in concealed form, having m elements by reading out elements whose positions are $x+i_0, \ldots, x+i_{m-1}$ from a secure text array $<a>$, which represents plain text array "a" in concealed form, having n elements while concealing x, wherein x denotes an absolute position of the element to be read out in the array a, $i_0, \ldots, i_{m-1}$ denote relative positions of the elements to be read out from x in the array a, x is an integer that is equal to or higher than 0 and less than n, and $i_0, \ldots, i_{m-1}$ are integers that are equal to or higher than 0 and less than n, the secure computation method comprising:

receiving, over a network, a secret share of the secure text array $<a>=(<a[0]>, \ldots, <a[n-1]>)$, a secret share of a secure text $<x>$, and the plain text integers $i_0, \ldots, i_{m-1}$, wherein the secure text array $<a>$ is obtained by securing the array $a=(a[0], \ldots, a[n-1])$ having a size of n by secret sharing, and the secure text $<x>$ is obtained by securing an integer x by secret sharing, by circuitry of each of three or more secure computation devices, wherein secret sharing is a process in which an entire original plain text data is concealed from each of a plurality of devices by dividing the entire original plain text data into fragments which are shared among the plurality of devices;

obtaining a secure text array <a'>=(<a'[0]>, ..., <a'[n−1]>) using the secure text array <a> and the secure text <x>, wherein the secure text array <a'> is obtained by securing an array a'=(a'[0], ..., a'[n−1]) by secret sharing, and the array a' is obtained by shifting leftward the array a by x, by the circuitry of each of the three or more secure computation devices; and generating a secure text array <b>=(<a'[$i_0$]>, ..., <a'[$i_{m-1}$]>) from the secure text array <a'> by the circuitry of each of the three or more secure computation devices, wherein each of the three or more secure computation devices is configured to act upon a divided portion of the secure text array <a>, and the secure text <x>, and the secure text array <b>, such that the original values of a, x, and b are concealed from each of the three or more secure computation devices.

6. A secure computation method for generating a secure text array <b>, which represents plain text array "b" in concealed form, having m elements by reading out elements whose positions are x+0, ..., x+m−1 from a secure text array <a>, which represents plain text array "a" in concealed form, having n elements while concealing x, wherein x denotes an absolute position of the element to be read out in the array a, m denotes a count of elements to be read out from x, x is an integer that is equal to or higher than 0 and less than n, and m is a natural number, the secure computation method comprising:

receiving, over a network, a secret share of the secure text array <a>=(<a[0]>, ..., <a[n−1]>), a secret share of a secure text <x>, and the plain text natural number m, wherein the secure text array <a> is obtained by securing the array a=(a[0], ..., a[n−1]), having a size of n, by secret sharing, and the secure text <x> is obtained by securing an integer x by secret sharing, by circuitry of each of three or more secure computation devices, wherein secret sharing is a process in which an entire original plain text data is concealed from each of a plurality of devices by dividing the entire original plain text data into fragments which are shared among the plurality of devices;

obtaining a secure text array <a'>=(<a'[0]>, ..., <a'[n−1]>) using the secure text array <a> and the secure text <x>, wherein the secure text array <a'> is obtained by securing an array a'=(a'[0], ..., a'[n−1]) by secret sharing, and the array a' is obtained by shifting leftward the array a by x, by the circuitry of each of the three or more secure computation devices; and generating a secure text array <b>=(<a'[0]>, ..., <a'[m−1]>) from the secure text array <a'> by the circuitry of each of the three or more secure computation devices, wherein each of the three or more secure computation devices is configured to act upon a divided portion of the secure text array <a>, and the secure text <x>, and the secure text array <b>, such that the original values of a, x, and b are concealed from each of the three or more secure computation devices.

7. A non-transitory computer readable medium including computer executable instructions that make a secure computation device perform a method for generating a secure text array <b>, which represents plain text array "b" in concealed form, having m elements by reading out elements whose positions are x+$i_0$, ..., x+$i_{m-1}$ from a secure text array <a>, which represents plain text array "a" in concealed form, having n elements while concealing x, wherein x denotes an absolute position of the element to be read out in the array a, $i_0$, ..., $i_{m-1}$ denote relative positions of the elements to be read out from x in the array a, x is an integer that is equal to or higher than 0 and less than n, and $i_0$, ..., $i_{m-1}$ are integers that are equal to or higher than 0 and less than n, the method comprising:

receiving, over a network, a secret share of the secure text array <a>=(<a[0]>, ..., <a[n−1]>), a secret share of a secure text <x>, and the plain text integers $i_0$, ..., $i_{m-1}$, wherein the secure text array <a> is obtained by securing the array a=(a[0], ..., a[n−1]), having a size of n, by secret sharing, and the secure text <x> is obtained by securing an integer x by secret sharing, wherein secret sharing is a process in which an entire original plain text data is concealed from each of a plurality of devices by dividing the entire original plain text data into fragments which are shared among the plurality of devices;

obtaining a secure text array <a'>=(<a'[0]>, ..., <a'[n−1]>) using the secure text array <a> and the secure text <x>, wherein the secure text array <a'> is obtained by securing an array a'=(a'[0], ..., a'[n−1]) by secret sharing, and the array a' is obtained by shifting leftward the array a by x; and generating a secure text array <b>=(<a'[$i_0$]>, ..., <a'[$i_{m-1}$]>) from the secure text array <a'>, wherein each of the three or more secure computation devices is configured to act upon a divided portion of the secure text array <a>, and the secure text <x>, and the secure text array <b>, such that the original values of a, x, and b are concealed from each of the three or more secure computation devices.

8. A non-transitory computer readable medium including computer executable instructions that make a secure computation device perform a method for generating a secure text array <b>, which represents plain text array "b" in concealed form, having m elements by reading out elements whose positions are x+0, ..., x+m−1 from a secure text array <a>, which represents plain text array "a" in concealed form, having n elements while concealing x, wherein x denotes an absolute position of the element to be read out in the array a, m denotes a count of elements to be read out from x, x is an integer that is equal to or higher than 0 and less than n, and m is a natural number, the method comprising, receiving, over a network, a secret share of the secure text array <a>=(<a[0]>, ..., <a[n−1]>), a secret share of a secure text <x>, and the plain text natural number m, wherein the secure text array <a> is obtained by securing the array a=(a[0], ..., a[n−1]) having a size of n by secret sharing, and the secure text <x> is obtained by securing an integer x by secret sharing, wherein secret sharing is a process in which an entire original plain text data is concealed from each of a plurality of devices by dividing the entire original plain text data into fragments which are shared among the plurality of devices;

obtaining a secure text array <a'>=(<a'[0]>, ..., <a'[n−1]>) using the secure text array <a> and the secure text <x>, wherein the secure text array <a'> is obtained by securing an array a'=(a'[0], ..., a'[n−1]) by secret sharing, and the array a' is obtained by shifting leftward the array a by x; and generating a secure text array <b>=(<a'[0]>, ..., <a'[m−1]>) from the secure text array <a'>,
wherein each of the three or more secure computation devices is configured to act upon a divided portion of the secure text array <a>, and the secure text <x>, and the secure text array <b>, such that the original values of a, x, and b are concealed from each of the three or more secure computation devices.

* * * * *